United States Patent [19]

Mori et al.

[11] Patent Number: 5,756,001
[45] Date of Patent: May 26, 1998

[54] HIGH CONCENTRATION ALUMINA SOL OF LOW VISCOSITY

[75] Inventors: Hiroo Mori; Hachirou Hirano, both of Ichihara; Masaharu Tanaka, Yokohama; Kunihiko Terase, Ichihara, all of Japan

[73] Assignee: Asahi Glass Company Ltd., Tokyo, Japan

[21] Appl. No.: 636,305

[22] Filed: Apr. 23, 1996

[30] Foreign Application Priority Data

Apr. 24, 1995 [JP] Japan ................... 7-098896

[51] Int. Cl.$^6$ .................. B01J 13/00; C01F 7/02
[52] U.S. Cl. ................... 252/313.1; 423/625
[58] Field of Search ................. 423/625; 252/313.1

[56] References Cited

U.S. PATENT DOCUMENTS

| | | | |
|---|---|---|---|
| 4,055,509 | 10/1977 | Weimer | 252/313.1 |
| 4,211,667 | 7/1980 | Yamada et al. | 252/313.1 |
| 4,244,835 | 1/1981 | Block | 252/313.1 |
| 4,360,449 | 11/1982 | Oberlander et al. | 423/625 |
| 4,801,399 | 1/1989 | Clark et al. | 252/313.1 |
| 5,407,600 | 4/1995 | Ando et al. | 423/115 |

FOREIGN PATENT DOCUMENTS

| | | | |
|---|---|---|---|
| 674475 | 11/1963 | Canada | 252/313.1 |
| 55-23034 | 2/1980 | Japan | |

OTHER PUBLICATIONS

Database WPI, Derwent Publications, AN 83-57646K, JP-A-58 076 462, May 9, 1983.
Database WPI, Derwent Publications, AN 95-0111485, JP-A-06 297 832, Oct. 25, 1994.
Database WPI, Derwent Publications, AN 92-121102, JP-A-04 067 985, Mar. 3, 1992.
Patent Abstracts of Japan, vol. 11, No. 150 (C-422), May 15, 1987, JP-A-61 283335, Dec. 13, 1986.
Patent Abstracts of Japan, vol. 13, No. 447 (C-642), Oct. 6, 1989, JP-A-01 171633, Jul. 6, 1989.
Database WPI, Derwent Publications, AN 95-144364, JP-A-07 068 919, Mar. 14, 1995.
Chemical Abstracts, AN 99:196743, JP-58076462, May 9, 1983.

*Primary Examiner*—Steven Bos
*Attorney, Agent, or Firm*—Oblon, Spivak, McClelland, Maier & Neustadt, P.C.

[57] ABSTRACT

An alumina sol having an alumina solid content of at least 10 wt % and a viscosity of not higher than 5 Pa.s measured by a Brookfield viscometer and containing a cation other than a hydrogen ion in a total ion equivalent concentration in the range of from $2.0 \times 10^{-4}$ to $1.0 \times 10^{-1}$ N and a method of preparing the same.

12 Claims, No Drawings

HIGH CONCENTRATION ALUMINA SOL OF LOW VISCOSITY

BACKGROUND OF THE INVENTION

1. Field of the Invention

The present invention relates to a high concentration alumina sol having a low viscosity, which is used as a starting material for coating materials, paints, adsorbents, ceramics and catalysts.

2. Discussion of the Background

Heretofore, many alumina sols having various concentrations and viscosities have been commercially sold, used or studied. However, conventional alumina sols have a low concentration (5–10 wt %) to avoid gelation or high viscosity, and therefore they sometimes caused a problem when using them as a starting material for coating materials or the like. Also, there was a problem that an alumina sol became so viscous as to cause gelation over time if the alumina sol was concentrated in order to obtain a high concentration alumina sol.

Examples of a conventional high concentration alumina sol having a low viscosity include an alumina sol having a water soluble aliphatic amino acid or its derivative (lactams) incorporated therein (see Japanese Unexamined Patent Publication No. 283335/1986), an alumina sol containing an acid amide (see Japanese Unexamined Patent Publication No. 171633/1989), and the like. However, these conventional alumina sols contain expensive and complicated compounds, and their viscosities were not always satisfactorily low. Also, it is known that the addition of an alkali or salt containing a cation other than a hydrogen ion generally raises the viscosity of an alumina sol and causes gelation of the alumina sol.

SUMMARY OF THE INVENTION

An object of the present invention is to provide an alumina sol having a high concentration and a low viscosity, which can be efficiently used as various alumina sources.

DESCRIPTION OF THE PREFERRED EMBODIMENTS

The present invention provides an alumina sol having an alumina solid content of at least 10 wt % and a viscosity of not higher than 5 Pa.s measured by a Brookfield viscometer and containing a cation other than a hydrogen ion in a total ion equivalent concentration in the range of from $2.0 \times 10^{-4}$ to $1.0 \times 10^{-1}$ N.

It is essential that the total ion equivalent concentration of a cation other than a hydrogen ion is in the range of from $2.0 \times 10^{-4}$ to $1.0 \times 10^{-1}$ N. If the total ion equivalent concentration is less than $2.0 \times 10^{-4}$ N, an effect of reducing a viscosity is insufficient. On the other hand, if the total ion equivalent concentration exceeds $1.0 \times 10^{-1}$ N, a high viscosity or gelation is caused depending on a preparation method. In view of the stability of a viscosity, the total ion equivalent concentration is more preferably from $4.0 \times 10^{-4}$ to $5.0 \times 10^{-2}$ N. The term "equivalent concentration" used herein means a value obtained by multiplying an ion mol concentration (mol/liter) by an ionic valence for each ion, and this value is expressed by the unit "N" in the present specification.

Preferable examples of a cation other than a hydrogen ion include an alkali metal ion such as $Na^+$ and $K^+$, an alkaline earth metal ion such as $Mg^{2+}$ and $Ca^{2+}$, and an ammonium ion ($NH_4^+$). Other metallic ions such as $Fe^{3+}$, $Cu^{2+}$ and $Zn^{2+}$ can also be used. In case that an ammonium ion is used, it can be easily removed by such an operation as drying or calcining.

These cations can be added in the form of a salt (e.g. an inorganic salt such as NaCl, $Na_2SO_4$, $CaCl_2$ or $MgCl_2$, and an organic salt such as sodium acetate, magnesium acetate or sodium tartrate), or also in the form of an alkali (such as NaOH, KOH and $NH_4OH$).

These cations can be incorporated into an alumina sol by various methods, for example, by adding to a raw material at the initial stage of preparation of an alumina sol or by adding at any optional stage during preparation of an alumina sol. Even after an alumina sol is concentrated to more than 10 wt %, these cations can be incorporated therein, thereby greatly reducing the viscosity of the alumina sol.

It is essential for the alumina sol of the present invention to have a solid content of at least 10 wt %. If the solid content is less than 10 wt %, it does not satisfy such an alumina content as required when used as a starting material for coating materials, and transportation and preservation can not be effectively conducted. Also, when the solid content is too low, the aimed effect achieved by adding a cation is hardly realized. It is preferable for coating materials and transportation to make the solid content higher, but if the solid content of the alumina sol exceeds 50 wt %, the viscosity of the alumna sol unfavorably increases and the alumina sol tends to gel in spite of adding a cation in accordance with the present invention. Thus, particularly preferable solid content ranges from 15 to 30 wt %.

The alumina sol of the present invention has a viscosity of not higher than 5 Pa.s as measured by a brookfield viscometer. If the viscosity exceeds 5 Pa.s, the alumina sol becomes difficult to handle and tends to cause gelation. The viscosity of the alumina sol is connected with various factors, and for example, the viscosity tends to increase as a secondary aggregation diameter of alumina in the sol becomes larger. The above mentioned cations are effective in the same manner also with regard to alumina sols of various secondary aggregation diameters having various viscosities. The secondary aggregation diameter of the alumina sol is preferably not larger than 500 nm.

Alumina sol particles in the alumina sol of the present invention are aluminum oxide or its hydrate ($Al_2O_3 \cdot nH_2O$), which include boehmite (n=1–1.5), amorphous alumina (n= about 3) and the like. Particularly, boehmite is preferable. As a solvent, an aqueous solvent, a lower alcohol or its mixture can be used. Particularly, an aqueous solvent is preferable.

As alumina sol particles, alumina particles prepared by hydrolyzing an aluminum alkoxide are preferable. Since an alumina sol prepared therefrom contains only a small amount of cations other than a hydrogen ion, the content of cations other than a hydrogen ion can be favorably accurately controlled. When using alumina particles obtained by hydrolyzing an inorganic salt such as aluminum chloride, it is preferable to add cations other than a hydrogen ion after removing by-produced salts by ultrafiltration or other method.

The xerogel obtained by drying the alumina sol at 140° C. for 1 hour, preferably has a pore volume of not less than 0.5 ml/g with pores having a radius of from 1 to 30 nm.

The function of cations other than a hydrogen ion in the present invention is not clear, but it is considered that these cations change the structure of an electric double layer having an influence on a viscosity by being adsorbed on the surface of alumina or by varying a dielectric constant of a solvent used. Heretofore, it is considered that the addition of a cation raises a viscosity, but this is probably because the addition amount of a cation is much higher in the conventional case than in the claimed range of the present invention.

EXAMPLES

In the following Examples, a viscosity was measured at 30° C. by means of a Brookfield viscometer (BM type viscometer manufactured by Tokimec Inc.), and rotor No.4 was used. The concentration of alumina was determined by measuring a weight change after drying an alumina sol at 140° C. for 4 hours. The amount of Na, K, Ca or Mg was determined by an atomic absorption spectrophotometer, and the amount of $NH_4$ was determined by distillation method.

Example 1

Various alumina sols were prepared by adding an aqueous solution of each of additives shown in the following Table 1 to 100 g of an alumina sol having a secondary aggregation diameter of 260 nm and a solid content of 18.5 wt %, which was obtained by hydrolyzing an aluminum alkoxide, followed by peptization with acetic acid. For comparison, a comparative sol containing no additive and a comparative sol containing distilled water only were prepared.

TABLE 1

| Sample No. | Additives | Concentration of aqueous solution/N | Amount added/$cm^3$ |
|---|---|---|---|
| 1 | No additive | — | — |
| 2 | Distilled water | — | 3.5 |
| 3 | NaOH | 0.1 | 3.5 |
| 4 | NaCl | 0.1 | 3.5 |
| 5 | $Na_2SO_4$ | 0.1 | 3.5 |
| 6 | Sodium acetate | 0.1 | 3.5 |
| 7 | KOH | 0.1 | 3.5 |
| 8 | $NH_4OH$ | 0.1 | 3.8 |
| 9 | $CaCl_2$ | 0.2 | 0.9 |
| 10 | $MgCl_2$ | 0.2 | 0.9 |
| 11 | $CaCl_2$ | 0.2 | 1.8 |
| 12 | $MgCl_2$ | 0.2 | 1.8 |

Each of above prepared alumina sols was measured with respect to ion concentration (equivalent concentration), alumina concentration and viscosity in sol, and the results are shown in the following Table 2. The viscosity of sol did not change after four days.

TABLE 2

| Sample No. | Ion concentration in sol/$10^{-6}$N | | | | | Total ion concentration in sol/N | Alumina concentration/ wt % | Viscosity/ Pa · s |
|---|---|---|---|---|---|---|---|---|
| | $Na^+$ | $K^+$ | $Ca^{2+}$ | $Mg^{2+}$ | $NH_4^+$ | | | |
| 1 | 13 | 2.6 | 0 | 25 | 0 | $4.0 \times 10^{-5}$ | 18.5 | 5.10 |
| 2 | 13 | 2.5 | 0 | 24 | 0 | $3.9 \times 10^{-5}$ | 17.9 | 4.35 |
| 3 | 3500 | 2.5 | 0 | 24 | 0 | $3.5 \times 10^{-3}$ | 17.9 | 0.180 |
| 4 | 3500 | 2.5 | 0 | 24 | 0 | $3.5 \times 10^{-3}$ | 17.9 | 0.160 |
| 5 | 3500 | 2.5 | 0 | 24 | 0 | $3.5 \times 10^{-3}$ | 17.9 | 0.170 |
| 6 | 3500 | 2.5 | 0 | 24 | 0 | $3.5 \times 10^{-3}$ | 17.9 | 0.170 |
| 7 | 13 | 3500 | 0 | 24 | 0 | $3.5 \times 10^{-3}$ | 17.9 | 0.210 |
| 8 | 13 | 2.5 | 0 | 24 | 3800 | $3.8 \times 10^{-3}$ | 17.8 | 0.160 |
| 9 | 13 | 2.5 | 1800 | 24 | 0 | $1.8 \times 10^{-3}$ | 18.3 | 0.400 |
| 10 | 13 | 2.5 | 0 | 1800 | 0 | $1.8 \times 10^{-3}$ | 18.3 | 0.350 |
| 11 | 13 | 2.5 | 3600 | 24 | 0 | $3.6 \times 10^{-3}$ | 18.2 | 0.125 |
| 12 | 13 | 2.5 | 0 | 3600 | 0 | $3.6 \times 10^{-3}$ | 18.2 | 0.125 |

Example 2

Viscosities were measured after adding a sodium acetate aqueous solution in various equivalent concentrations to 100 g of an alumina sol having a secondary aggregation diameter of 350 nm and a solid content of 18.5 wt %, which was obtained by hydrolyzing an aluminum alkoxide, followed by peptization with acetic acid. The ion concentration of the alumina sol containing no additive was the same as in Table 1. Sodium ion concentration (equivalent concentration), alumina concentration and viscosity of each alumina sol were measured and the results are shown in the following Table 3. The lowest column of Table 3 indicates a comparative example. To this alumina sol, was added acetic acid in such an amount as to introduce acetic acid ion in the same amount as in the case of adding sodium acetate, but there was no change in viscosity. Thus, it was proved that the viscosity change was not caused by the presence of acetic acid ion.

TABLE 3

| | Na Concentration/N | Alumina concentration/ wt % | Viscosity/ Pa · s |
|---|---|---|---|
| Sol containing no additive | $1.3 \times 10^{-5}$ | 18.5 | 9.00 |
| Sol having sodium acetate added therein | $2.2 \times 10^{-4}$ | 18.5 | 4.50 |
| | $4.3 \times 10^{-4}$ | 18.4 | 2.72 |
| | $8.7 \times 10^{-4}$ | 18.3 | 2.07 |
| | $1.7 \times 10^{-3}$ | 18.2 | 0.870 |
| | $2.6 \times 10^{-3}$ | 18.0 | 0.440 |
| | $3.5 \times 10^{-3}$ | 17.9 | 0.340 |
| | $6.5 \times 10^{-3}$ | 17.4 | 0.140 |
| | $4.3 \times 10^{-2}$ | 17.6 | 4.80 |
| | $1.3 \times 10^{-1}$ | 17.6 | at least $10^2$ |

Example 3

An alumina sol having an Na concentration of $6.5 \times 10^{-3}$ N was obtained by adding 6.5 cc of a 1/10N aqueous solution of sodium acetate to 100 g of an alumina sol having a secondary aggregation diameter of 350 nm and a solid content of 18.5 wt %, which was obtained by hydrolyzing an aluminum alkoxide, followed by peptization with acetic acid. This alumina sol was stepwise concentrated by means of an ultrafiltration device, and a viscosity was measured at each step. The results are shown in the following Table 4.

TABLE 4

| Alumina concentration/wt % | Viscosity/Pa · s |
|---|---|
| 17.4 | 0.140 |
| 20.1 | 1.20 |
| 22.5 | 3.16 |
| 23.5 | 4.80 |

As mentioned above, the high concentration alumina sol of low viscosity of the present invention is easy to handle since it has a low viscosity although its concentration is high. Thus, an energy required for drying a solvent can be saved when a drying step is required. Consequently, the alumina sol of the present invention is suitably usable as a starting material for coating materials, paints, adsorbents, ceramics or catalysts, or for other industries.

We claim:

1. An alumina sol comprising:
   an alumina solid content of from 15 to 30 wt %; and
   a total ion equivalent concentration of a cation other than a hydrogen ion in the range of from $1.7 \times 10^{-3}$ to $6.5 \times 10^{-3}$ N,
   wherein said alumina sol has a viscosity of not higher than 0.870 Pa.s as measured by a Brookfield viscometer; and wherein the equivalent concentration is obtained by multiplying an ion mol concentration (mol/liter) by an ionic valence for each ion.

2. The alumina sol according to claim 1, wherein a cation other than a hydrogen ion is at least one member selected from the group consisting of an alkali metal ion, an alkaline earth metal ion and an ammonium ion.

3. The alumina sol according to claim 1, wherein the alumina is boehmite.

4. The alumina sol according to claim 1, wherein the alumina is a hydrolysate of an aluminum alkoxide.

5. The alumina sol according to claim 1, wherein the alumina sol has a secondary aggregation diameter of not larger than 500 nm.

6. A method for preparing the alumina sol according to claim 1, comprising:

adding a cation other than a hydrogen ion to an alumina sol;

wherein the cation other than a hydrogen ion is an alkali.

7. The alumina sol according to claim 1, wherein the alumina is a hydrolysate of an inorganic salt of aluminum.

8. A method for preparing the alumina sol according to claim 1, comprising:

adding a cation other than a hydrogen ion to an alumina sol;

wherein said cation other than a hydrogen ion is a salt.

9. The method according to claim 8, wherein the initial alumina sol is obtained by hydrolyzing an aluminium alkoxide.

10. The method according to claim 8, wherein the initial alumina sol is obtained by hydrolyzing an inorganic salt containing aluminium.

11. The method according to claim 10, wherein the alumina sol obtained by hydrolyzing an inorganic salt containing aluminum is subjected to ultrafiltration to remove by-produced salts, and thereafter a cation other than a hydrogen ion is added thereto.

12. The method according to claim 8, wherein the alumina is boehmite.

* * * * *